United States Patent Office
3,839,585
Patented Oct. 1, 1974

3,839,585
METHOD OF TREATING HYPERTENSION
Victor J. Lotti, Harleysville, and Clement A. Stone, Bell,
Pa., assignors to Merck & Co., Inc., Rahway, N.J.
No Drawing. Continuation of abandoned application Ser.
No. 61,390, Aug. 5, 1970. This application Apr. 30,
1973, Ser. No. 355,373
Int. Cl. A61k 27/00
U.S. Cl. 424—319                                    13 Claims

ABSTRACT OF THE DISCLOSURE

A method of treating hypertension in an animal by administering to the animal m-tyrosine or its salts in conjunction with a decarboxylase inhibitor such as α-hydrazino-α-substituted-3,4-dihydroxyphenylpropionic acid or its salts wherein the substituent is hydrogen or lower alkyl.

---

This is a continuation application Ser. No. 61,390, filed Aug. 5, 1970, now abandoned.

The present invention relates to a novel and useful method for the treatment of hypertension (high blood pressure). More particularly, it relates to a method of treating hypertension in an animal which comprises administering to the animal m-tyrosine or its salts in combination with a decarboxylase inhibitor.

It is known in the art that hypertension is a disease which is being encountered in medical practice in increasing frequency. Many drugs are known which will help aleviate the symptoms of hypertension such as diuretics, L-α-methyldopa, tranquilizers and the like. In many instances, however, the hypertensive patient has a chronic condition which requires extended treatment over the lifetime of the patient. With such extended treatment the medical practitioner frequently finds that the patient will develop either a sensitivity or a tolerance to the drug which in many instances requires the discontinuance of treatment. Quite obviously, if alternate drugs were available, they would receive acceptance in the field of hypertension.

It is an object of the present invention to provide a method of treating hypertension. Another object is to provide a method for lowering blood pressure by the use of relatively non-toxic materials. A still further object is to provide alternative drugs for the treatment of hypertension when a patient develops a sensitivity or tolerance to currently used hypertension drugs. Other objects will become apparent as the description of the invention proceeds.

These objects are accomplished by the present invention which provides a method of treating hypertension in an animal which comprises administering to the animal a compound (A) selected from the group consisting of m-tyrosine and the pharmaceutically acceptable salts thereof in combination with (B) a decarboxylase inhibitor.

The present invention further provides a method of treating hypertension in an animal which comprises administering to the animal a compound (A) selected from the group consisting of m-tyrosine and the pharmaceutically acceptable salts thereof in combination with a compound (B) selected from the group consisting of L-α-hydrazino-α - substituted - 3,4 - dihydroxyphenylpropionic acid, wherein the substituent is H or lower alkyl and the pharmaceutically acceptable salts thereof.

The m-tyrosine employed in the present invention has the structural formula

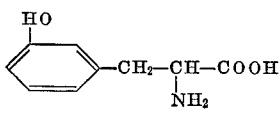

Since m-tyrosine has an asymmertic carbon atom, it exists as a racemic mixture and contains both the D and the L stereoisomers. The compound can be employed as a racemate but it is prefered that the L stereoisomer be used since it is most probable that it constitutes the total activity of the racemate.

The "decarboxylase inhibitors" employed in the present invention are well known in the art as shown by U.S. Pats. 2,868,818, 3,178,476, 3,395,176, 3,462,536; Belgian Pats. 737,418, 737,419, 737,420, Glamkowski et al. "Journal of Medicinal Chemistry" Volume 10 (1967) pp. 852–855; Porter et al., "Biochemical Pharmacology," Volume 11 (1962) pp. 1067–1077; and Clark "Pharmacological Reviews," Volume 11 (1959) pp. 330–349. Preferably, the decarboxylase inhibitors are those which do not pass the blood-brain barrier and which inhibit the decarboxylation of aromatic amino acids. A preferred class of inhibitors are those given in the aforementioned patents and articles wherein the inhibitor contains the

group. The most prefered inhibitors are given in U.S. Pat. 3,462,536.

In a preferred embodiment of the present invention the m-tyrosine is employed in combination with α-hydrazino-α-substituted - 3,4 - dihydroxyphenylpropionic acid, wherein the substituent is H or lower alkyl, or its pharmaceutically acceptable salts. Such compounds have the following structural formula

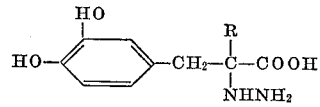

wherein R is H or lower alkyl.

In a still more preferred embodiment of the present invention both the m-tyrosine and hydrazine compounds are employed in the L form and the drugs are administered intraveneously or orally. Preferably, the drugs are administered sequentially with the α-hydrazino-α-substituted-3,4-dihydroxyphenylpropionic acid being given a few minutes to about 5 hours prior to the administration of m-tyrosine. As a practical matter, however, the drugs are generally given simultaneously in a single pill or capsule. The combination is usually given in amounts of from about 5 to about 200 mg./kg. of body weight with the ratio of m-tyrosine to the hydrazine compound being from about 0.2 to about 8, preferably about 0.5 to about 6 with about 2 to about 4 being the optimum ratio (weight basis).

In a preferred embodiment of the present invention, the hydrazine compound is α-hydrazino-α-methyl-3,4-dihydroxyphenylpropionic acid or α-hydrazino-3,4-dihydroxyphenylpropionic acid. With the latter compound either the D or L isomers may be used as well as the racemate since both compounds are active. With the former compound, only the L isomer of the compound is active.

The pharmaceutically acceptable salts of the drugs which may be used include, without limitation, the alkali metal and ammonium salts of the carboxy function and the hydrochloride, hydrobromide, sulfate and the like salts of the amino function. The term "lower alkyl" means an alkyl group containing from a 1 to about 4 carbon atoms. In one of the preferred embodiments of the present invention, the free base compounds are used and not the salts.

The invention will now be described by reference to the following examples in which all parts are expressed in parts by weight unless otherwise indicated.

EXAMPLES

The tests are carried out on mongrel dogs of both sexes weighing 7 to 11 kilograms and all animals are anesthetized with vinbarbitol, 50 mg./kg. i.v. Systolic and diastolic arterial blood pressures are measured by means of a catheter placed in the femoral artery and then attached to a Statham transducer which itself was attached to a Sanborn 150 polygraph recorder. The test compounds are dissolved in 1.0 N HCl and the solution is then brought to 0.1 N HCl with physiological saline. The test compounds are administered in solution via the femoral vein (2 minutes infusion). Recordings are made at 2, 5, 15, 30, 60 and 120 minutes after giving the test compounds. The results are given in the table below.

TABLE

[Mean arterial blood pressure (BP), mm. Hg, and heart rate (HR), beats/minute]

| Ex. | Treatment | Animals | Control values | | Time—minutes after drugs | | | | | | | | | | | |
|---|---|---|---|---|---|---|---|---|---|---|---|---|---|---|---|---|
| | | | | | 2 | | 5 | | 15 | | 30 | | 60 | | 120 | |
| | | | BP | HR | BP | HR | BP | HR | BP | HR | BP | HR | BP | HR | BP | HR |
| 1 | Control, acidic saline | Average of 5 dogs. | 155 | 149 | 157 | 150 | 158 | 151 | 154 | 151 | 155 | 143 | 154 | 131 | 143 | 117 |
| 2 | L-α-hydrazino-α-methyl-3,4-dihydroxy phenylpropionic acid, 15 mg./kg. | do | 127 | 159 | 127 | 151 | 127 | 147 | 127 | 149 | 125 | 133 | 125 | 136 | 127 | 126 |
| 3[1] | DL-m-tyrosine, 50 mg./kg | do | 105 | 128 | 132 | 108 | 224 | 145 | 160 | 122 | 142 | 122 | 131 | 176 | 105 | 185 |
| 4 | L-α-hydrazino-α-methyl-3,4-dihydroxy phenylpropionic acid, 15 mg./kg. and then DL-m-tyrosine, 50 mg./kg. 5 min. later (timing then started). | do | 124 | 135 | 90 | 112 | 104 | 110 | 90 | 100 | 85 | 98 | 87 | 96 | 85 | 91 |

[1] Supplemental anesthesia required throughout experiment.

As shown by Example 1, the control acidic saline solution has essentially no effect on blood pressure. As shown by Example 2, the α-hydrazino-α-methyl-3,4-dihydroxy-phenylpropionic acid has essentially no effect on the blood pressure. As shown by Example 3, DL-m-tyrosine actually elevates the blood pressure during the first hour and then drops back to normal. As shown by Example 4, the combination of the hydrazine compound and DL-m-tyrosine substantially lowers blood pressure. Since one of the compounds by itself has no effect on blood pressure and the other compound by itself elevates blood pressure, it is quite surprising that the two compounds together would lower blood pressure.

With the above examples only the use of m-tyrosine in combination with the hydrazine compounds has been shown, it should be noted that the compounds would generally be utilized with other drugs such as tranquilizers, diuretics, muscle relaxants and the like to help alleviate the symptoms of hypertension.

Many other equivalent modifications of the invention would be apparent to those skilled in the art from a reading of the foregoing without a departure from the inventive concept.

What is claimed is:

1. A method of treating hypertension in a patient which comprises administering to the patient an effective amount of a composition containing compound (A) selected from the group consisting of m-tyrosine and the non-toxic pharmaceutically acceptable salts thereof in combination with a compound (B) selected from the group consisting of L-α-hydrazino-α-substituted-3,4 - dihydroxyphenylpropionic acid, wherein the substituent is H or lower alkyl of 1 to 4 carbon atoms, and the non-toxic pharmaceutically acceptable salts thereof.

2. The method of Claim 1 wherein the compound (A) is a racemate.

3. The method of Claim 1 wherein the compound (A) is in the L stereo configuration.

4. The method of Claim 1 wherein the compound (B) is racemic α-hydrazino-α-methyl-3,4-dihydroxyphenylpropionic acid.

5. The method of Claim 1 wherein the compound (B) is L-α-hydrazino-α-methyl-3,4-dihydroxyphenylpropionic acid.

6. The method of Claim 1 wherein the compound (B) is racemic α-hydrazino-3,4 - dihydroxyphenylpropionic acid.

7. The method of Claim 1 wherein the compound (B) is L-α-hydrazino-3,4-dihydroxyphenylpropionic acid.

8. The method of Claim 1 wherein the ratio of compound (A) to compound (B) is from about 0.2 to about 8.

9. The method of Claim 1 wherein the ratio of compound (A) to compound (B) is from about 0.5 to about 6.

10. The method of Claim 1 wherein the ratio of compound (A) to compound (B) is about 2 to about 4.

11. The method of Claim 1 wherein the compounds are administered orally.

12. The method of Claim 1 wherein the compounds are administered sequentially.

13. The method of Claim 1 wherein the compounds are administered simultaneously.

References Cited

UNITED STATES PATENTS 3,462,536   8/1969   Chemerda et al. __ 434—319 X

OTHER REFERENCES

Dawes et al., British Journal of Pharmacology, vol. 5, pp. 65–76 (1950).

SAM ROSEN, Primary Examiner

U.S. Cl. X.R.

424—327